United States Patent [19]

Eswarakrishnan et al.

[11] Patent Number: 5,130,349
[45] Date of Patent: Jul. 14, 1992

[54] INTUMESCENT FLAME RETARDANT COMPOSITION

[75] Inventors: Seetha Eswarakrishnan, Allison Park; Carol L. Knox, Monroeville; Suresh B. Damle, Pittsburgh, all of Pa.

[73] Assignee: PPG Industries, Inc., Pittsburgh, Pa.

[21] Appl. No.: 788,905

[22] Filed: Nov. 7, 1991

[51] Int. Cl.$^5$ ............................................. C09K 21/14
[52] U.S. Cl. ...................................... 523/179; 521/85; 521/93; 521/107; 521/108; 521/126; 521/143; 521/146; 521/149; 521/182; 521/183
[58] Field of Search ...................... 523/179; 521/93, 85, 521/143, 146, 182, 183, 149, 108, 109, 126

[56] References Cited

U.S. PATENT DOCUMENTS

| | | | |
|---|---|---|---|
| 2,583,084 | 1/1952 | Burt | 260/429 |
| 3,562,197 | 2/1971 | Sears et al. | 260/28.5 |
| 3,936,416 | 2/1976 | Brady | 260/42.18 |
| 4,118,422 | 10/1978 | Klein | 521/167 |
| 4,184,024 | 1/1980 | Klein | 521/167 |
| 4,347,334 | 8/1982 | Staendeke et al. | 524/416 |
| 4,782,099 | 11/1988 | Dietrich et al. | 521/175 |
| 4,797,430 | 1/1989 | Haas et al. | 521/164 |

OTHER PUBLICATIONS

R. S. Bains et al., *An Evaluation of the Performance of Tin-Based Flame-Retardant Paints*, JOCCA (1990(8)).
E. Berlow et al, *The Penaerythritols*, American Chemical Society Monograph Series, Reinhold Publishing Corp., 1958, p. 51.
Chemical Abstracts 98:107448c, *Synthesis of New Dibutyl- and Tributyltin Derivatives of Nitrogen Containing Heterocycles*.

*Primary Examiner*—Morton Foelak
*Attorney, Agent, or Firm*—George D. Morris

[57] ABSTRACT

The water resistance of intumescent compositions is improved if the composition comprises at least one organotin derivative of a polyol. Organotin derivatives of polyols can be produced by reacting polyol with dialkyltin oxide or with dialkyltin dialkoxide.

24 Claims, No Drawings

INTUMESCENT FLAME RETARDANT COMPOSITION

The use of organic polymers, and especially of polyolefins, for insulating electrically conducting wiring is known. Generally the organic polymer is extruded around the wire during manufacture. The organic polymer insulation is a good electrical insulator and, when used alone, is substantially waterproof. The main disadvantage of organic polymer insulation is its flammability. Once ignited, the burning organic polymer produces copious amounts of smoke and drips burning liquid organic polymer which tends to spread the fire. Organic polymer insulated wires and cables and bundles of these are therefore substantial fire hazards. It is commonplace in buildings and ships to have bundles of insulated electrical wires and cables passing through openings in walls or bulkheads to expedite the delivery of electrical power from room to room. In time of fire these openings can be instrumental in spreading the fire and smoke from room to room.

Various fire retardants have been admixed with the organic polymer in order to provide fire retardancy to the composition. These have been only partially successful, however, because most fire retardants are not very compatible with organic polymers or because they are prohibitively expensive for commercial applications.

One approach that has been followed is the incorporation of materials which impact intumescence to the organic polymer-based insulation composition. Such intumescent compositions form adherent chars which swell up and impede further burning of the underlying composition. One class of intumescent compositions used for electrical wiring insulation comprises organic polymer, ammonium polyphosphate, and at least one carbonific. In most, but not all, cases at least one spumific is also present. Carbonifics are nonresinous materials which produce large volumes of both nonflammable gas and carbon in the presence of phosphoric acid. Carbonific materials are generally carbohydrates or polyfunctional alcohols such as pentaerythritol. Spumifics are materials which release large quantities of gas at elevated temperatures. Spumifics are often resinous in nature and often act as binders in addition to forming gas. Spumific materials are most often amides or amines such as urea, guanidine, or dicyandiamide, which liberate gaseous pyrolysis products.

Ammonium polyphosphate, often abbreviated "APP", is particularly useful because it has a high phosphorus content and because it yields phosphoric acid at temperatures below the decomposition temperatures of the carbonifics and spumifics and yet above the normal temperatures used for processing the intumescent composition.

Notwithstanding their advantages, intumescent compositions comprising organic polymer, ammonium polyphosphate, and at least one carbonific suffer from the distinct disadvantage that they are generally deficient in water resistance. Leaching of one or more components from the composition can lead to failure of the electrical insulating properties of the composition, and reduction of fire retardancy. Although it is not desired to be bound by any theory, it is believed that a major cause of low water resistance is the significant water solubility of the carbonific, especially of the polyfunctional alcohols, viz., the polyols.

It has now been found that organotin derivatives of polyols not only provide carbonific functionality to intumescent compositions but that they increase the water resistance of the compositions. Accordingly, the present invention is a composition comprising organic polymer, ammonium polyphosphate, and organotin derivative of polyol.

The organic polymer employed is water-insoluble and can be of many varying types. The organic polymer is usually flammable but in some cases it may be non-flammable. Ordinarily the organic polymer is thermoplastic. In most, but not all, instances the organic polymer is halogen-free. The organic polymer may be a homopolymer, a copolymer, a terpolymer, an interpolymer, a graft polymer, or a mixture of polymers. Examples of polymers which may be used include polyolefins, polystyrene, polyesters, polyamides, polyurethanes (including poly(ester urethanes) and poly(ether urethanes)), and polycarbonates. The preferred organic polymers are the polyolefins, including polyethylene (high density, medium density, low density, linear low density, or mixtures), polypropylene (atactic, isotactic, syndiotactic, stereoblock, or mixtures), copolymers or ethylene and propylene, copolymers or ethylene and vinyl acetate, and mixtures thereof, and poly(ester urethanes).

The ammonium polyphosphates are known polymeric phosphates, having P—O—P linkages and may be represented by the formula:

$$H_{n-m+2}(NH_4)_m P_n O_{3n+1} \qquad (I)$$

wherein the average value of n is at least about 10, the average value of m is a number up to n+2, and the ratio m/n is in the range of from about 0.7 to about 1.2. In most cases the average value of n is in the range of from about 10 to about 1000. From about 250 to about 750 is preferred. The values of n and m for any particular compound will be positive integers, while the average values of n and m for a mixture of compounds constituting the ammonium polyphosphate may each individually be a positive integer or a positive number which is not an integer.

The organotin derivatives of polyols contain at least one organotin group represented by the formula:

$$\begin{array}{c} R^1 \\ | \\ -CH_2O-Sn-OCH_2- \\ | \\ R^2 \end{array} \qquad (II)$$

wherein $R^1$ and $R^2$ are each independently lower alkyl. The organotin group may be a portion of a ring of the organotin derivative or it may be an aliphatic portion of the organotin derivative.

Organotin derivatives of polyols can be produced by reacting polyol with dialkyltin oxide or with dialkyltin dialkoxide where the alkyl groups attached to the tin atom correspond to $R^1$ and $R^2$ of Formula (II). In the case of the dialkyltin dialkoxide, the alkoxy groups attached to the tin atom are each independently lower alkoxy. Examples of suitable dialkyltin oxides include dimethyltin oxide [CAS 2273-45-2], diethyltin oxide [CAS 3682-12-0], dipropyltin oxide [CAS 7664-98-4], diisopropyltin oxide [CAS 23668-76-0], and dibutyltin oxide [CAS 818-08-6]. Examples of suitable dialkyl dialkoxides include dibutyltin dimethoxide [CAS 1067-55-6], dibutyltin diethoxide [CAS 1067-41-0], dibutyltin diisopropoxide [CAS 14538-83-1], and dibutyltin dibutoxide [CAS 3349-36-8]. Preferably the dialkyltin oxide is dibutyltin oxide and the dialkyltin dialkoxide is dibutyltin dimethoxide or dibutyltin dibutoxide. The $R^1$ and $R^2$ groups of Formula (II) are preferably both butyl. Examples of polyols which may be reacted with dialkyltin oxide or dialkyltin dialkoxide include erythritol [CAS 149-32-6], pentaerythritol [CAS 115-77-5], dipentaerythritol [CAS 126-58-9], tripentaerythritol [CAS 78-24-0], tris(2-hydroxyethyl) isocyanurate [CAS 839-90-7] which is also known as THEIC, glycerol [CAS 56-81-5], starch, glucose [CAS 50-99-7], sucrose [CAS 57-50-1], sorbitol [CAS 50-70-4], mannitol [CAS 69-65-8], 1,1,1-trimethylolethane [CAS 77-85-0], 1,1,1-trimethylolpropane [CAS 77-99-6], ethylene glycol [CAS 107-21-1], diethylene glycol [CAS 111-46-6], triethylene glycol [CAS 112-27-6], tetraethylene glycol [CAS 112-60-7], trimethylene glycol [CAS 504-63-2], propylene glycol [CAS 57-55-6], dipropylene glycol [CAS 110-98-5], neopentyl glycol [CAS 126-30-7], 1,5-hexanediol [CAS 928-40-5], 1,6-hexanediol [CAS 629-11-8], 1,2-cyclohexanediol [CAS 931-17-9], 1,3-cyclohexanediol [CAS 504-01-8], 1,4-cyclohexanediol [CAS 556-48-9], 1,2-cyclohexanedimethanol [CAS 3971-29-7], 1,3-cyclohexanedimethanol [CAS 3971-28-6], and 1,4-cyclohexanedimethanol [CAS 105-08-8]. Polyols having a hydroxy functionality of at least three are preferred. Polyols having a hydroxy functionality of at least four are especially preferred. The preferred polyols are pentaerythritol and tris(2-hydroxyethyl) isocyanurate.

Since the dialkyltin oxide and the dialkyltin dialkoxide each react with two hydroxyl groups, the equivalent weight of each of these materials is half that of the molecular weight. The equivalent weight of the polyol is the molecular weight of the polyol divided by its hydroxyl functionality.

The relative proportions of dialkyltin compound and polyol employed may be widely varied. In most cases the ratio of the equivalents of dialkyltin oxide and/or dialkyl dialkoxide to the equivalents of polyol is in the range of from about 0.1:100 to about 105:100. Frequently the ratio is in the range of from about 1:100 to about 75:100. From about 2:100 to about 50:100 is preferred.

The reaction can be conducted in various manners depending upon the dialkyltin compound and the polyol employed. In the case of dialkyltin oxide, reaction in a water-immiscible solvent under azeotropic distillation condition for removal of water may be used. Dialkyltin oxide and the polyol may also be reacted in an organic water-miscible solvent followed by removal of the solvent and water. Dialkyltin dialkoxide and polyol are conveniently reacted neat while the by-product alcohol is removed by distillation.

The amount of organic polymer present in the composition of the invention may be widely varied. In most instances the organic polymer contributes from about 5 to about 95 percent by weight of the composition. Frequently the organic polymer constitutes from about 30 to about 80 percent by weight of the composition. From about 50 to about 75 percent by weight is preferred.

The amounts of APP which are present in compositions of the invention are subject to wide variation. Ordinarily the weight ratio of the APP to the organic polymer is in the range of from about 10:100 to about 100:100. Often the weight ratio is in the range of from about 15:100 to about 85:100. A weight ratio in the range of from about 20:100 to about 70:100 is preferred.

The amounts of organotin derivative of polyol which are present in compositions of the invention may also be widely varied. Ordinarily the weight ratio of organotin derivative of polyol to the organic polymer is in the range of from about 1:100 to about 100:100. Often the weight ratio is in the range of from about 5:100 to about 60:100. A weight ratio in the range of from about 3:100 to about 15:100 is preferred.

In most cases the composition also comprises one or more spumifics. The presence of spumific is optional, and therefore the amount present, if any, may be widely varied. When spumific is used, the weight ratio of spumific the organic polymer is ordinarily in the range of from about 1:100 to about 100:100. Often the weight ratio is in the range of from about 1.5:100 to about 50:100. A weight ratio in the range of from about 2:100 to about 10:100 is preferred.

One or more other materials which will increase fire retardancy may optionally be present in the composition. Examples of such materials include zinc oxide, zinc borate, and ferric oxide.

The compositions of the invention may optionally contain plasticizers, pigments, dyes, tints, antioxidants, visible light stabilizers, ultraviolet light stabilizers, and the like.

The listing of optional ingredients discussed above is by no means exhaustive. These and other ingredients may be employed in their customary amounts for their customary purposes so long as they are not antagonistic to flame retardant performance and good polymer formulating practice.

The polymer-containing composition of the invention can be prepared by admixing the various ingredients. The temperature at which the materials are mixed may be widely varied. In general, the temperature is at least that at which the polymer is a viscous liquid and below the decomposition temperature of any of the ingredients. in most cases the temperature is in the range of from about 125° C. to about 300° C. From about 150° C. to about 200° C. is preferred.

The compositions of the present invention have fire retardant characteristics and find many uses. They may be formulated as concentrates to be let down with additional organic polymer for further use. They may be extruded into fibers, films, or other shapes, or molded, shaped, or formed into substantially any form. A preferred use, however, is an electrical insulation for wires and cables.

The invention is further described in conjunction with the following examples which are to be considered illustrative rather than limiting, and in which all parts are parts by weight and all percentages are percentages by weight unless otherwise specified.

EXAMPLES

The following general methods were employed for the syntheses and testing of organotin derivatives of polyols:

GENERAL SYNTHESIS METHOD 1

A three neck flask fitted with a Dean-Stark trap for the azeotropic distillation of water was charged with the polyol, dibutyltin oxide and solvent (benzene, toluene, or cyclohexane). The heterogeneous mixture was stirred and heated until no more water was collected (about 6 to 8 hours). The reaction mixture was cooled and either filtered to remove the solids or the solvent was removed by evaporation under reduced pressure. The solids were dried in a 100° C. oven under vacuum at an absolute pressure of less than 1333 pascals, absolute.

GENERAL SYNTHESIS METHOD 2

The polyol and dibutyltin oxide in methanol were heated under reflux until a clear solution was obtained. The methanol was evaporated under reduced pressure and the solids were dried.

GENERAL SYNTHESIS METHOD 3

The polyol and either dibutyltin dimethoxide or dibutyltin dibutoxide were heated and the alcohol by-product was distilled over. The molten product was cooled and ground.

IMMERSION TEST METHOD

For each composition tested, an additive mixture was formed by admixing 66 parts by weight particulate ammonium polyphosphate, 24 parts by weight organotin derivative of polyol, and 10 parts by weight melamine cyanurate. Seventy parts by weight polyethylene was introduced into a mixer and melted. Thirty parts by weight of the additive mixture was added to the melt and the materials were mixed until uniform to produce a test composition. Plaques 0.76 millimeters thick were pressed out and cut into two pieces. A 0.05 millimeter thick copper shim was pressed between the two pieces of resin to form an electrode. The electrode was placed in a beaker filled with water and placed in a 75° C. oven. A copper strip was placed on the inside of the beaker to act as a ground. A resistance meter was used to take daily readings of the electrodes while immersed in water at 75° C. Failure is recorded as the onset of decay of resistance.

LIMITING OXYGEN INDEX METHOD

Several samples (7.62 cm×0.635 cm×0.3175 cm bars) were made and the Limiting Oxygen Index (LOI) was determined according to ASTM Method D 2863-87.

ABBREVIATIONS

Abbreviations are shown in Table 1.

TABLE 1

| Abbreviation | Name |
|---|---|
| PENTOL | Pentaerythritol |
| DIPENTOL | Dipentaerythritol |
| EG | Ethylene glycol |
| THEIC | Tris(2-hydroxyethyl) isocyanurate |
| DBTO | Dibutyltin oxide. |
| DBTDMO | Dibutyltin dimethoxide |
| DBTDBO | Dibutyltin dibutoxide |
| Equiv. Ratio | Equivalents of dialkyltin compound per 100 equivalents of polyol |
| ITTF | Immersion Test, Time to Fail (days) |
| LOI | Limiting Oxygen Index |

TEST RESULTS

Test results are shown in Table 2. For the controls, polyol rather than organotin derivative of polyol was employed.

TABLE 2

| Example | Derivative | Equiv. Ratio | ITTF | LOI |
|---|---|---|---|---|
| 1 | DBTO + PENTOL | 0.5:100 | 7 | 20.0 |
| 2 | DBTO + PENTOL | 2.5:100 | 19 | 19.5 |
| 3 | DBTO + PENTOL | 25:100 | 23 | 21.0 |
| 4 | DBTO + PENTOL | 50:100 | 28 | 21.1 |
| 5 | DBTO + PENTOL | 100:100 | ?? | 21.0 |
| 6 | DBTO + DIPENTOL | 0.33:100 | 8 | 22.0 |
| 7 | DBTO + DIPENTOL | 0.67:100 | 16 | 22.0 |
| 8 | DBTDBO + THEIC | 33.3:100 | 17 | 27.0 |
| 9 | DBTDMO + THEIC | 33.3:100 | 14 | 27.5 |
| 10 | DBTO + EG | 100:100 | 17 | 22.0 |
| Control | Polyol | | | |
| C-1 | PENTOL | 0:100 | 0 | 22.0 |
| C-2 | DIPENTOL | 0:100 | 7 | 23.0 |
| C-3 | THEIC | 0:100 | 5 | 29.5 |

Although the present invention has been described with reference to specific details of certain embodiments thereof, it is not intended that such details should be regarded as limitations upon the scope of the invention except insofar as they are included in the accompanying claims.

We claim:

1. A composition comprising organic polymer, ammonium polyphosphate, and organotin derivative of polyol
2. The composition of claim 1 wherein said organic polymer is halogen-free.
3. The composition of claim 1 wherein said organic polymer is polyolefin.
4. The composition of claim 1 wherein said organic polymer is polyethylene.
5. The composition of claim 1 wherein said organotin derivative of said polyol contains at least one organotin group represented by the formula:

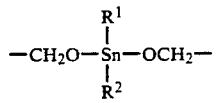

where $R^1$ and $R^2$ are both butyl.

6. The composition of claim 1 wherein said organotin derivative is the reaction product of dialkyltin oxide and said polyol.
7. The composition of claim 6 wherein said dialkyltin oxide is dibutyltin oxide.
8. The composition of claim 1 wherein said organotin derivative is the reaction product of dialkyltin dialkoxide and said polyol.
9. The composition of claim 8 wherein said dialkyltin dialkoxide is dibutyltin dimethoxide.
10. The composition of claim 8 wherein said dialkyltin dialkoxide is dibutyltin dibutoxide.
11. The composition of claim 1 wherein said polyol has a hydroxy functionality of at least three.
12. The composition of claim 1 wherein said polyol has a hydroxy functionality of at least four.
13. The composition of claim 1 wherein said polyol is pentaerythritol.
14. The composition of claim 1 wherein said polyol is dipentaerythritol.
15. The composition of claim 1 wherein said polyol is tris(2-hydroxyethyl) isocyanurate.
16. The composition of claim 1 wherein said polyol is ethylene glycol.

17. The composition of claim 1 which additionally comprises spumific.

18. The composition of claim 1 wherein:
(a) said organic polymer constitutes from about 5 to about 95 percent by weight of said composition;
(b) the weight ratio of said ammonium polyphosphate to said organic polymer is in the range of from about 10:100 to about 100:100; and
(c) the weight ratio of said organotin derivative of said polyol to said organic polymer is in the range of from about 1:100 to about 100:100.

19. The composition of claim 18 wherein:
(a) said organic polymer is polyolefin; and
(b) said organotin derivative of said polyol is the reaction product of a member of the group consisting of dibutyltin oxide, dibutyltin dimethoxide, and dibutyltin dibutoxide, and said polyol.

20. The composition of claim 19 wherein said polyol is selected from the group consisting of pentaerythritol, dipentaerythritol, tris(2-hydroxyethyl) isocyanurate, and ethylene glycol.

21. The composition of claim 1 wherein:
(a) said organic polymer constitutes from about 5 to about 95 percent by weight of said composition;
(b) the weight ratio of said ammonium polyphosphate to said organic polymer is in the range of from about 20:100 to about 70:100; and
(c) the weight ratio of said organotin derivative of said polyol to said organic polymer is in the range of from about 3:100 to about 15:100.

22. The composition of claim 21 wherein:
(a) said organic polymer is polyolefin; and
(b) said organotin derivative of said polyol is the reaction product of a member of the group consisting of dibutyltin oxide, dibutyltin dimethoxide, and dibutyltin dibutoxide, and said polyol.

23. The composition of claim 22 wherein said polyol is selected from the group consisting of pentaerythritol, dipentaerythritol, tris(2-hydroxyethyl) isocyanurate, and ethylene glycol.

24. The composition of claim 23 wherein said polyolefin is polyethylene.

* * * * *